United States Patent
Itaya

[11] 4,200,357
[45] Apr. 29, 1980

[54] PHOTO EYEPIECE FOR MICROSCOPES

[75] Inventor: Hideo Itaya, Hachiouji, Japan

[73] Assignee: Olympus Optical Co., Ltd., Tokyo, Japan

[21] Appl. No.: 915,994

[22] Filed: Jun. 15, 1978

[30] Foreign Application Priority Data

Jun. 1977 [JP] Japan .................................. 52/76532

[51] Int. Cl.² ........................ G02B 3/00; G02B 25/00
[52] U.S. Cl. .................... 350/175 E; 350/45; 350/223
[58] Field of Search ........... 350/175 E, 175 ML, 176, 350/223, 45

[56] References Cited

U.S. PATENT DOCUMENTS

| 2,481,688 | 9/1949 | Schade et al. | 350/223 |
| 3,176,583 | 4/1965 | Klein | 350/175 ML X |
| 3,838,911 | 10/1974 | Ikeda | 350/176 X |
| 3,848,972 | 11/1974 | Nakamura | 350/176 X |

Primary Examiner—Paul A. Sacher
Attorney, Agent, or Firm—Cushman, Darby & Cushman

[57] ABSTRACT

A photo eyepiece for microscopes comprising a front lens group consisting of a first positive meniscus lens component, and a rear lens group consisting of a second positive single or cemented lens component, a third negative lens component and a fourth positive single or cemented lens component. Astigmatism, curvature of field, etc. are favorably corrected in said photo eyepiece so that it can form good images over a wide visual field of micrography.

5 Claims, 6 Drawing Figures

PHOTO EYEPIECE FOR MICROSCOPES

BACKGROUND OF THE INVENTION (a) Field of the Invention

The present invention relates to a photo eyepiece for microscopes, and more specifically to an ocular lens system for micrography which is so adapted as to assure good image qualities over a wide visual field in micrography.

(b) Description of the Prior Art

In micrography, the conventional ocular lens systems had a common defect that they could not form flat images over a wide visual field due to marginal astigmatism and curvature of field even when they are used in combination with plan type microscope objective lens systems.

SUMMARY OF THE INVENTION

A general object of the present invention is to provide a photo eyepiece for micrography which is so adapted as to favorably correct lateral chromatic aberration remaining in an objective lens system as well as astigmatism and curvature of field in the ocular itself so that good images can be obtained over a wide visual field in micrography.

The photo eyepiece for microscopes according to the present invention comprises a front lens group designed as a field lens and a rear lens group: said front lens group being arranged on the side of the objective lens as compared with the image formed by said objective lens and serving for converging rays, and said rear lens group being designed as Tesser type. The photo eyepiece for microscopes according to the present invention in an ocular lens system having an aperture ratio of about F/2.8 and wherein astigmatism and coma are favorably corrected. Speaking in other words, the lens system according to the present invention comprises a front lens group comprising a first lens component of a positive meniscus lens having a convex surface on the object side and a rear lens group comprising a second positive single or cemented lens component, a third negative lens component and a fourth positive single or cemented lens component, and said lens system satisfying the following conditions:

(1) $2.4 \leq f_1/f_{234} \leq 5.0$
(2) $0.65 \leq d_2/f \leq 1.25$
(3) $0.12 \leq (n_a-n_b)f/|r_{ab}| \leq 0.26$ wherein the reference symbols represent as defined below:

f: focal length of the entire lens system as a whole
  $f_1$: focal length of said front lens group
  $f_{234}$: focal length of said rear lens group
  $d_2$: airspace between said front and rear lens groups
  $r_{ab}$: radius of curvature on the cemented surface in said rear lens group
  $n_a, n_b$: refractive indices of the lens elements of the cemented component in said rear lens group ($n_a$: refractive index of the positive lens element, and $n_b$: refractive index of the negative lens element)

In the lens system according to the present invention, angles of refraction for the principal ray are controlled to adequate levels on the surfaces of the respective lenses by selecting the ratio of $f_1/f_{234}$ between the focal lengths $f_1$ and $f_{234}$ of the front and rear lens groups within the range defined by the condition (1). If the ratio of $f_1/f_{234}$ is smaller than the lower limit of the condition (1), it will be impossible to correct astigmatism and curvature of field. If the ratio exceeds the upper limit of the condition (1), in contrast, it will be undesirable for mechanical design of the lens system since the first lens designed as a field lens forms a large image and, as a result, the eyepiece must unavoidably be designed as a large lens system.

In the next place, if $d_2$ is larger than the upper limit of the condition (2) adapted for defining the airspace $d_2$ between the front and rear lens groups, lateral chromatic aberration will be aggravated. If $d_2$ is smaller than the lower limit of the condition (2), in contrast, images of injuries and dust on the lens surface will be formed due to the fact that the image formed by the field lens is too close to the rear lens group. If $d_2$ is smaller than the lower limit of the condition (2), it will be necessary to impart a large power to the first lens, which will unavoidably make the ratio of $f_1/f_{234}$ smaller than the lower limit of the condition (1), thereby aggravating astigmatism and curvature of field. The condition (3) is required for favorably correcting lateral chromatic aberration, astigmatism and curvature of field. If $(n_a-n_b)f/r_{ab}$ exceeds the upper limit of the condition (3), lateral chromatic aberration will be undercorrected, thereby making it impossible to favorably correct lateral chromatic aberration produced by the objective lens system. If the ratio is smaller than the lower limit of the condition (3), astigmatism and coma will be overcorrected.

The photo eyepiece for microscopes further satisfies the following conditions.

(4) $1.5f < f_1 < 4.0f$
(5) $0.4f < f_2 < 0.8f$
(6) $-1.8f < f_3 < -0.2f$
(7) $0.3f < f_4 < 0.6f$ wherein the reference symbol $f_1$, $f_2$, $f_3$ and $f_4$ represent focal lengths of the first, second, third and fourth lens components respectively.

If $f_1$ is smaller than the lower limit of the condition (4), power of the first lens component will be too strong and aggravate astigmatism and curvature of field which cannot be corrected favorably by the other lens components. If $f_1$ exceeds the upper limit of the condition (4), in contrast, the first lens component will have too weak refractive power and cannot serve as a field lens.

If $f_2$ is smaller than the lower limit of the condition (5), paraxial spherical aberration will be corrected favorably, but offaxial coma will be aggravated, thereby making it impossible to keep proper balance with other types of aberrations. If $f_2$ is larger than the upper limit of the condition (5), in contrast, the second lens component will have too weak power to correct spherical aberration.

If $f_3$ is smaller than the lower limit of the condition (6), Petzval's sum can be minimized enough to favorably correct curvature of field, but spherical aberration will be too grave to be corrected by the other lens components. If $f_3$ is larger then the upper limit of the condition (6), in contrast, Petzval's sum will be increased enough to aggravate curvature of field.

If $f_4$ is larger than the upper limit or smaller than the lower limit of the condition (7), there will be produced adverse effect which is similar to that caused when $f_2$ is larger than the upper limit or smaller than the lower limit of the condition (5).

DESCRIPTION OF THE PREFERRED EMBODIMENTS

Now, some preferred embodiments of the present invention will be described in details with reference to the accompanying drawings.

EMBODIMENT 1

$r_1 = 0.48466$
  $d_1 = 0.09147$   $n_1 = 1.713$   $\nu_1 = 53.89$
$r_2 = 0.78720$
  $d_2 = 0.72222$
$r_3 = 0.70452$
  $d_3 = 0.07758$   $n_2 = 1.66755$   $\nu_2 = 41.93$
$r_4 = -1.04550$
  $d_4 = 0.12024$
$r_5 = -2.19659$
  $d_5 = 0.02778$   $n_3 = 1.62588$   $\nu_3 = 35.7$
$r_6 = 2.1633$
  $d_6 = 0.11170$
$r_7 = 0.55264$
  $d_7 = 0.09722$   $n_4 = 1.713$   $\nu_4 = 53.89$
$r_8 = -0.16912$
  $d_8 = 0.02976$   $n_5 = 1.6727$   $\nu_5 = 32.1$
$r_9 = -0.42321$
$f = 1.0, \beta = -2.5X, f_1 = 1.57$
$f_{234} = 0.5709, f_2 = 0.64, f_3 = -1.73, f_4 = 0.34$

EMBODIMENT 2

$r_1 = 0.52312$
  $d_1 = 0.12254$   $n_1 = 1.72342$   $\nu_1 = 37.95$
$r_2 = 0.74979$
  $d_2 = 0.75678$
$r_3 = 0.44923$
  $d_3 = 0.08506$   $n_2 = 1.6727$   $\nu_2 = 32.1$
$r_4 = -0.96409$
  $d_4 = 0.08293$
$r_5 = -0.69112$
  $d_5 = 0.03721$   $n_3 = 1.69895$   $\nu_3 = 30.12$
$r_6 = 0.21624$
  $d_6 = 0.09809$
$r_7 = 0.064064$
  $_7 = 0.03190$   $n_4 = 1.6398$   $\nu_4 = 34.48$
$r_8 = 0.18474$
  $d_8 = 0.13291$   $n_5 = 1.6779$   $\nu_5 = 55.33$
$r_9 = -0.36930$
$f = 1.0, \Gamma = -3.3X, f_1 = 1.95$
$f_{234} = 0.6565, f_2 = 0.47, f_3 = -0.23, f_4 = 0.35$

EMBODIMENT 3

$r_1 = 1.07122$
  $d_1 = 0.10264$   $h_1 = 1.8052$   $\nu_1 = 25.43$
$r_2 = 1.57488$
  $d_2 = 1.12365$
$r_3 = 0.89728$ $d_3 = 0.13137$   $n_2 = 1.735$   $\nu_2 = 49.82$
$r_4 = -0.47582$
  $d_4 = 0.04105$   $n_3 = 1.6727$   $\nu_3 = 32.1$
$r_5 = -1.40303$
  $d_5 = 0.06569$
$r_6 = \infty$
  $d_6 = 0.04516$   $n_4 = 1.6668$   $\nu_4 = 33.04$
$r_7 = 0.33295$
  $_7 = 0.10264$
$r_8 = 0.43682$
  $d_8 = 0.12316$   $n_5 = 1.6204$   $\nu_{60.27}$
$r_9 = -1.65095$
$f = 1.0, \beta = -5X, f_1 = 3.8$
$f_{234} = 0.8155, f_2 = 0.72, f_3 = -0.5, f_4 = 0.57$ wherein the reference symbols $r_1$ through $r_9$ represent radii of curvature on the surfaces of the respective lens elements, the reference symbols $d_1$ through $d_8$ denote thicknesses of the respective lens elements and airspaces therebetween, the reference symbols $n_1$ through $n_5$ designate refractive indices of the respective lens elements and $\nu_1$ through $\nu_5$ represent Abbe's numbers of the respective lens elements.

Figure 1:
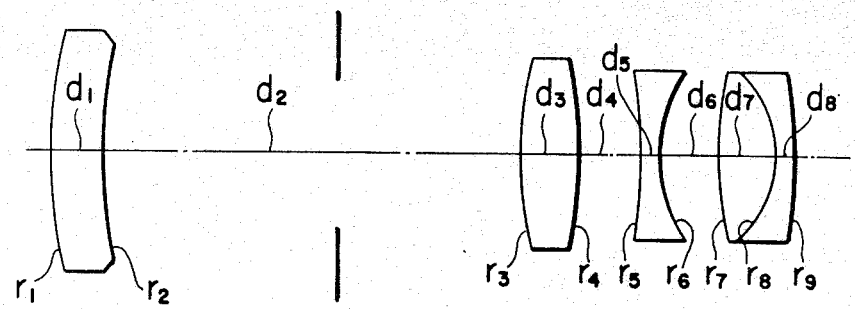
FIG. 1 shows a sectional view illustrating the composition of the Embodiment 1 of the present invention.
Figure 2:
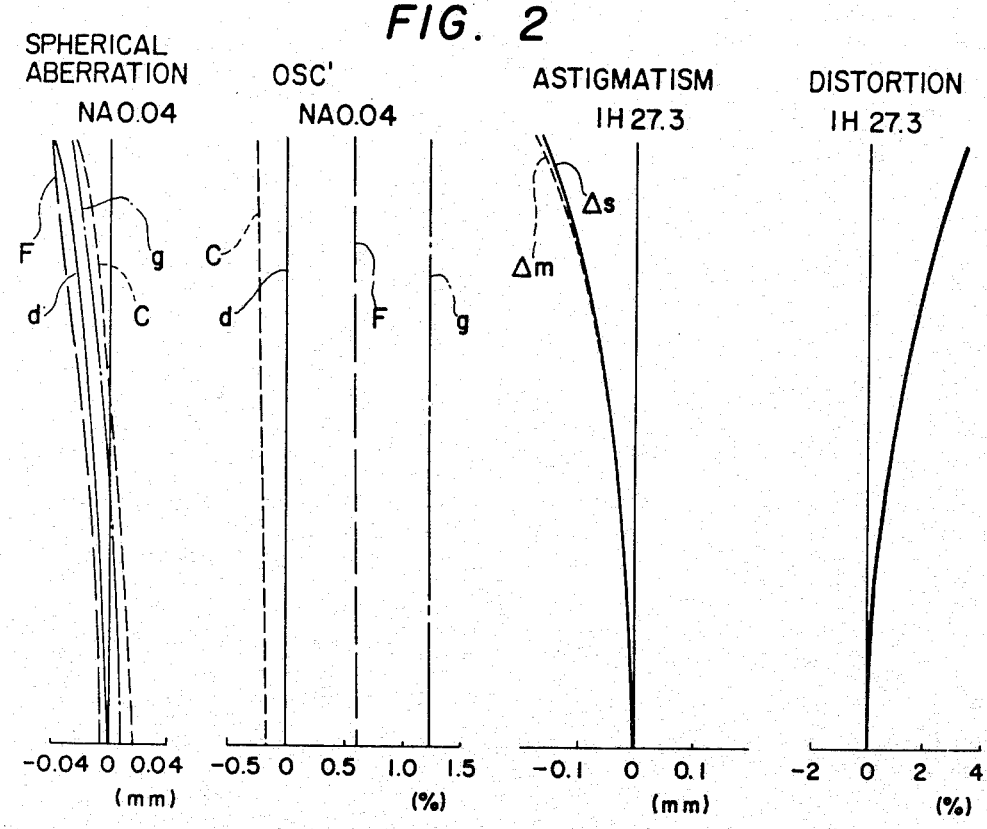
FIG. 2 shows graphs illustrating the aberration characteristics of the Embodiment 1.
Figure 3:
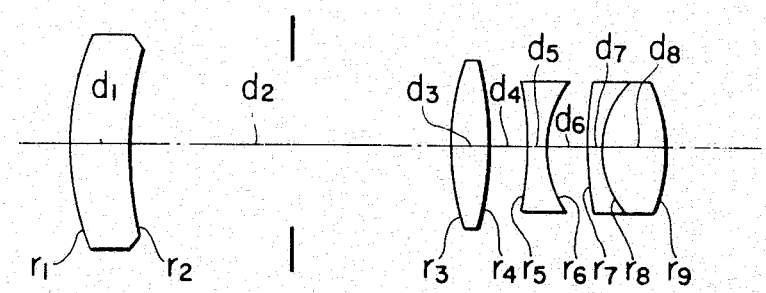
FIG. 3 illustrates a sectional view showing the composition of the Embodiment 2 of the present invention.
Figure 4:
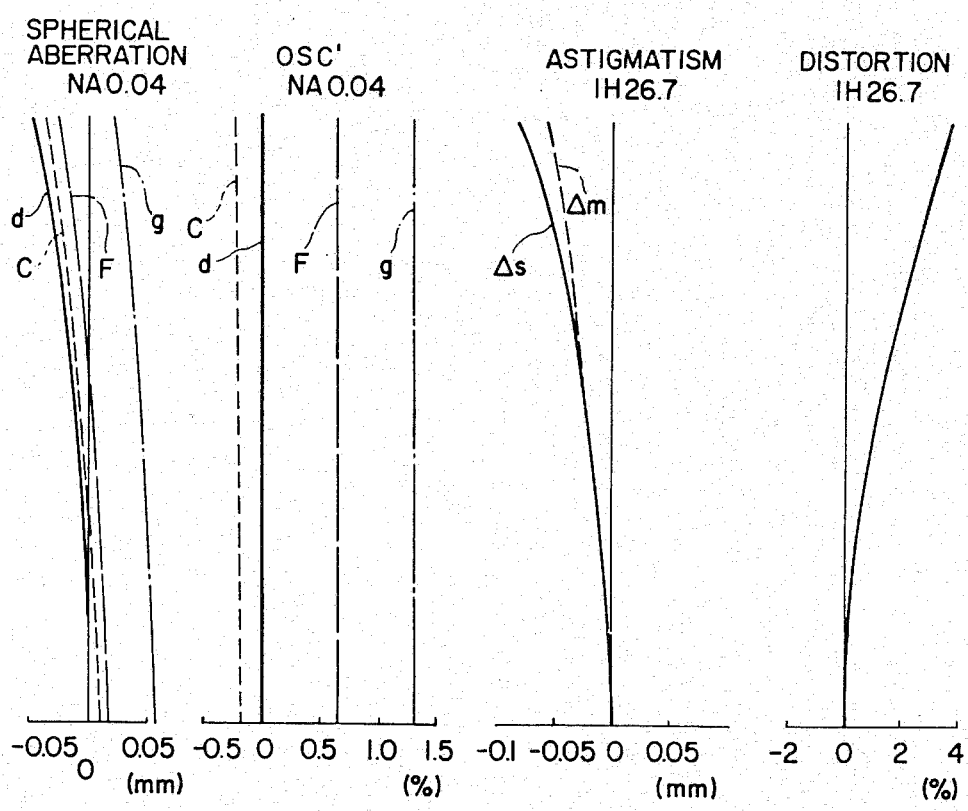
FIG. 4 illustrates curves showing the aberration characteristics of the Embodiment 2.
Figure 5:
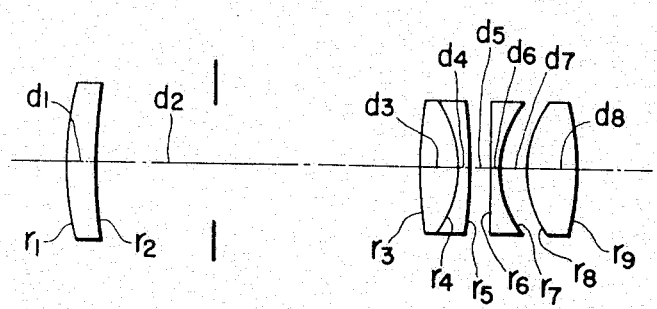
FIG. 5 shows a sectional view illustrating the composition of the Embodiment 3 of the present invention.
Figure 6:
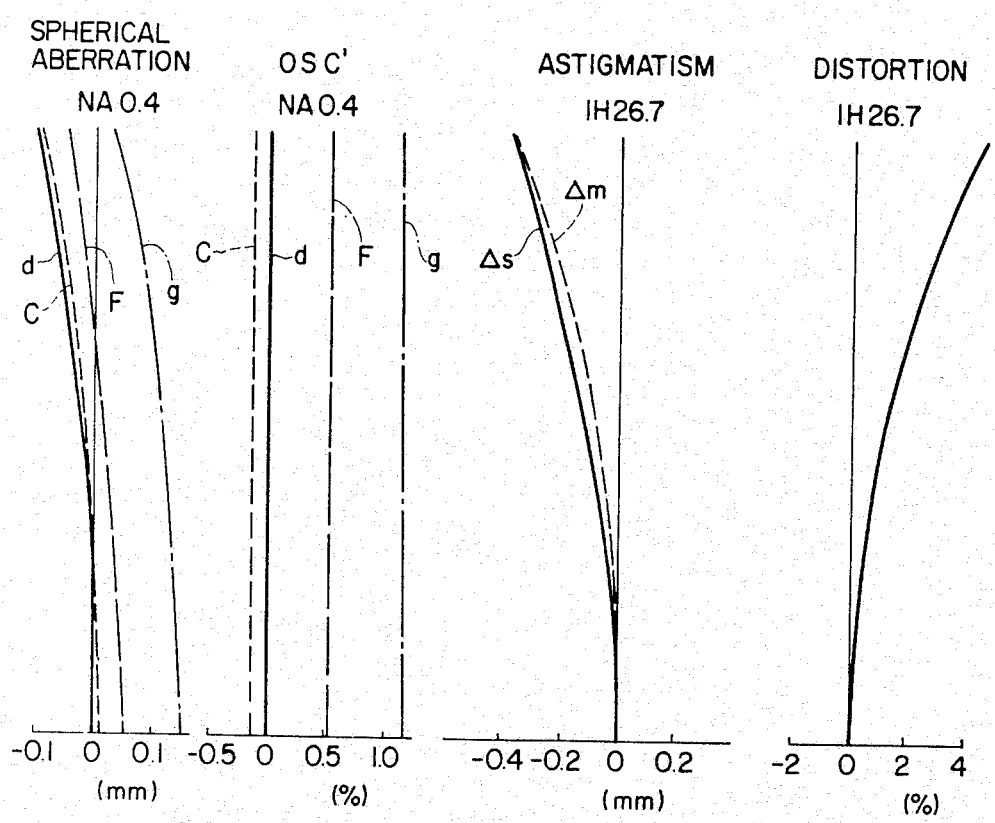
FIG. 6 shows graphs illustrating the aberration characteristics of the Embodiment 3.

Of the embodiments described above, Embodiment 1 has such a composition as shown in FIG. 1 wherein the fourth lens component in the rear lens group is a cemented doublet consisting of a positive lens element and a negative lens element and, therefore, the reference symbols $n_a$, $n_b$ and $r_{ab}$ used in the condition (3) correspond to $n_4$, $n_5$ and $r_8$ respectively. Embodiment 2 has such a composition as shown in FIG. 3 wherein the fourth lens component is a cemented doublet consisting of a negative lens element and a positive lens element and, therefore, the reference symbols $n_a$, $n_b$ and $r_{ab}$ used in the condition (3) correspond to $n_5$, $n_4$ and $r_8$ respectively. Further, the Embodiment 3 has such a composition as shown in FIG. 5 wherein the second lens component consists of a positive lens element and a negative lens element and, therefore, the reference symbols $n_a$, $n_b$ and $r_{ab}$ used in the condition (3) correspond to $n_2$, $n_3$ and $r_4$ respectively.

I claim:

1. A photo eyepiece for microscopes comprising a front lens group comprising a first positive meniscus lens component having a convex surface on the object side, and a rear lens group comprising a second lens component having positive refractive power, a third negative lens component and a fourth lens component having positive refractive power, at least one of said second and fourth lens components being a cemented doublet consisting of a positive lens element and a negative lens element, and said photo eyepiece satisfying the following conditions:

(1) $2.7 \leq f_1/f_{234} \leq 5.0$
(2) $0.72 \leq d_2/f \leq 1.25$
(3) $0.12 \leq (n_a - n_b)f/|r_{ab}| \leq 0.26$ wherein the reference symbol f represents the focal length of the lens system as a whole, the reference symbol $f_1$ designates the focal length of said front lens group, the reference symbol $f_{234}$ denotes the focal length of said rear lens group, the reference symbol $d_2$ represents the airspace between the front and rear lens groups, the reference symbol $r_{ab}$ designates radius of curvature on the cemented surface formed in the rear lens group, the reference symbols $n_a$ and $n_b$ denote refractive indices of the respective lens elements of the cemented component, $n_a$ being the refractive index of the positive lens element and $n_b$ being the refractive index of the negative lens element.

2. A photo eyepiece for microscopes according to claim 1 which additionally satisfies the following conditions (4) through (7):

(4) $1.5f < f_1 < 4.0f$
(5) $0.4f < f_2 < 0.8f$
(6) $-1.8f < f_3 < -0.2f$
(7) $0.3f < f_4 < 0.6f$

Wherein the reference symbol f represents the focal length of the lens system as a whole, and the reference symbol $f_1$, $f_2$, $f_3$ and $f_4$ represent focal lengths of the first, second, third and fourth lens components respectively.

3. A photo eyepiece for microscopes according to claim 1 wherein said second lens component is a positive single lens element and said fourth lens component is a cemented doublet consisting of a positive lens element and a negative lens element, and said photo eyepiece having the following numerical data:

| | | |
|---|---|---|
| $r_1 = 0.48466$ | | |
| $d_1 = 0.09147$ | $n_1 = 1.713$ | $\nu_1 = 53.89$ |
| $r_2 = 0.78720$ | | |
| $d_2 = 0.72222$ | | |
| $r_3 = 0.70452$ | | |
| $d_3 = 0.07758$ | $n_2 = 1.66755$ | $\nu_2 = 41.93$ |
| $r_4 = -1.04550$ | | |
| $d_4 = 0.12024$ | | |
| $r_5 = -2.19659$ | | |
| $d_5 = 0.02778$ | $n_3 = 1.62588$ | $\nu_3 = 35.7$ |
| $r_6 = 2.1633$ | | |
| $d_6 = 0.11170$ | | |
| $r_7 = 0.55264$ | | |
| $d_7 = 0.09722$ | $n_4 = 1.713$ | $\nu_4 = 53.89$ |
| $r_8 = -0.16912$ | | |
| $d_8 = 0.02976$ | $n_5 = 1.6727$ | $\nu_5 = 32.1$ |
| $r_9 = -0.42321$ | | |
| $f = 1.0, \beta = -2.5X, f_1 = 1.57$ | | |
| $f_{234} = 0.5709, f_2 = 0.64, f_3 = -1.73, f_4 = 0.34$ | | | wherein the reference symbols $r_1$ through $r_9$ represent radii of curvature on the surfaces of the respective lens elements, the reference symbols $d_1$ through $d_8$ denote thicknesses of the respective lens elements and airspaces therebetween, the reference symbols $n_1$ through $n_5$ designate refractive indices of the respective lens elements, $\nu_1$ through $\nu_5$ represent Abbe's numbers of the respective lens elements, reference symbol f denotes the focal length of the lens system as a whole, the reference symbols $f_1$, $f_2$, $f_3$, $f_4$ designate the focal length of the first, second, third and fourth lens components respectively and reference symbol $f_{234}$ represents the focal length of the rear lens group.

4. A photo eyepiece for microscopes according to claim 1 wherein said second lens component is a positive single lens element and said fourth lens component is a cemented doublet consisting of a negative lens element and a positive lens element, and said photo eyepiece having the following numerical data:

| | | |
|---|---|---|
| $r_1 = 0.52312$ | | |
| $d_1 = 0.12254$ | $n_1 = 1.72342$ | $\nu_1 = 37.95$ |
| $r_2 = 0.74979$ | | |
| $d_2 = 0.75678$ | | |
| $r_3 = 0.44923$ | | |
| $d_3 = 0.08506$ | $n_2 = 1.6727$ | $\nu_2 = 32.1$ |
| $r_4 = -0.96409$ | | |
| $d_4 = 0.08293$ | | |
| $r_5 = -0.69112$ | | |
| $d_5 = 0.03721$ | $n_3 = 1.69895$ | $\nu_3 = 30.12$ |
| $r_6 = 0.21624$ | | |
| $d_6 = 0.09809$ | | |
| $r_7 = 0.64064$ | | |
| $d_7 = 0.03190$ | $n_4 = 1.6398$ | $\nu_4 = 34.48$ |
| $r_8 = 0.18474$ | | |
| $d_8 = 0.13291$ | $n_5 = 1.6779$ | $\nu_5 = 55.33$ |
| $r_9 = -0.36930$ | | |
| $f = 1.0, \beta = -3.3X, f_1 = 1.95$ | | |
| $f_{234} = 0.6565, f_2 = 0.47, f_3 = -0.23, f_4 = 0.35$ | | | wherein the reference symbols $r_1$ through $r_9$ represent radii of curvature on the surfaces of the respective lens elements, the reference symbols $d_1$ through $d_8$ denote thicknesses of the respective lens elements and airspaces therebetween, the reference symbols $n_1$ through $n_5$ designate refractive indices of the respective lens elements, $\nu_1$ through $\nu_5$ represent Abbe's numbers of the respective lens elements, reference symbol f denotes the focal length of the lens system as a whole, the reference symbols $f_1$, $f_2$, $f_3$, $f_4$ designate the focal length of the first, second, third and fourth lens components respectively and reference symbol $f_{234}$ represents the focal length of the rear lens group.

5. A photo eyepiece for microscopes according to claim 1 wherein said second lens component is a cemented doublet consisting of a positive lens element and a negative lens element and said fourth lens component is a positive single lens element, and said eyepiece having the following numerical data:

| | | |
|---|---|---|
| $r_1 = 1.07122$ | | |
| $d_1 = 0.10264$ | $n_1 = 1.8052$ | $\nu_1 = 25.43$ |
| $r_2 = 1.57488$ | | |
| $d_2 = 1.12365$ | | |
| $r_3 = 0.89728$ | | |
| $d_3 = 0.13137$ | $n_2 = 1.735$ | $\nu_2 = 49.82$ |
| $r_4 = -0.47582$ | | |
| $d_4 = 0.04105$ | $n_3 = 1.6727$ | $\nu_3 = 32.1$ |
| $r_5 = -1.40303$ | | |
| $d_5 = 0.06569$ | | |
| $r_6 = \infty$ | | |
| $d_6 = 0.04516$ | $n_4 = 1.6668$ | $\nu_4 = 33.04$ |
| $r_7 = 0.33295$ | | |
| $d_7 = 0.10264$ | | |
| $r_8 = 0.43682$ | | |
| $d_8 = 0.12316$ | $n_5 = 1.6204$ | $\nu_5 = 60.27$ |
| $r_9 = -1.65095$ | | |
| $f = 1.0, \beta = -5X, f_1 = 3.8$ | | |
| $f_{234} = 0.8155, f_2 = 0.72, f_3 = -0.5, f_4 = 0.57$ | | | wherein the reference symbols $r_1$ through $r_9$ represent radii of curvature on the surfaces of the respective lens elements, the reference symbols $d_1$ through $d_8$ denote thicknesses of the respective lens elements and airspaces therebetween, the reference symbols $n_1$ through $n_5$ designate refractive indices of the respective lens elements, $\nu_1$ through $\nu_5$ represent Abbe's numbers of the respective lens elements, reference symbol f denotes the focal length of the lens system as a whole, the reference symbols $f_1$, $f_2$, $f_3$, $f_4$ designate the focal length of the first, second, third and fourth lens components respectively and reference symbol $f_{234}$ represents the focal length of the rear lens group.

* * * * *